United States Patent [19]

Bradu

[11] 3,931,906

[45] Jan. 13, 1976

[54] BULBS FOR CATHODE TUBES, PARTICULARLY FOR TELEVISION TUBES

[75] Inventor: Georges Bradu, Nemours, France

[73] Assignee: Societe des Verreries Industrielles Reunies du Loing, Paris, France

[22] Filed: Feb. 24, 1966

[21] Appl. No.: 529,747

[30] Foreign Application Priority Data

Mar. 4, 1965 France ................................ 65.7895

[52] U.S. Cl. ................ 425/505; 425/515; 425/381; 425/382 N; 425/464

[51] Int. Cl.² ............................................ B29C 23/00

[58] Field of Search ....... 220/2.1, 2.1 A, 2.3, 2.3 A; 313/64, 89; 65/106

[56] References Cited

UNITED STATES PATENTS

| | | | |
|---|---|---|---|
| 2,236,708 | 4/1941 | Grimditch | 220/2.1 A |
| 2,699,014 | 1/1955 | Van Steenis | 220/2.1 A UX |
| 2,728,012 | 12/1955 | Swedlund | 220/2.1 A X |
| 2,782,953 | 2/1957 | Koch et al. | 220/2.3 A |

*Primary Examiner*—Martha L. Rice
*Attorney, Agent, or Firm*—Robert V. Sloan

[57] ABSTRACT

A bulb for a cathode tube comprising a cone having a narrow end adapted to receive electronic devices therein and a wide substantially rectangular base end having a screen with a curved viewing portion secured thereto. The curved viewing screen is provided with a substantially rectangular peripheral contour complementary to the contour of the base end of the cone and the viewing portion is so curved that the sections therethrough parallel to the cone base end define curves which are substantially parallel to the cone base and contour.

3 Claims, 7 Drawing Figures

BULBS FOR CATHODE TUBES, PARTICULARLY FOR TELEVISION TUBES

The bulb of a cathode tube, and particularly a television tube, is generally obtained by welding together an element of conical form, the so-called "cone," of glass or metal which carries at its top the electronic device, with a screen of glass through which the television viewer sees the picture.

The base of the cone, at the end opposite the electronic device, has the form of a curvilinear rectangle. It is this rectangle to which the screen is connected by welding.

The screen has a curved form to resist the atmospheric pressure which is exerted against the vacuum existing inside the bulb. We can distinguish in the screen two parts: the viewing zone, curved, whose surface is generally derived from a sphere or torus, and the "apron" or border which is substantially perpendicular to the viewing zone and which is connected with the rectangular base of the cone.

The screen has thus substantially the form of a rectangular cover having a curved principal face constituting the viewing zone and four side walls constituting the apron.

Each of the four walls of the apron has the form of a rectangle whose base coincides with the corresponding side of the base of the cone but whose height is smallest at the ends, regularly increasing up to the center, because of the spherical form of the viewing zone which each wall of the apron intercepts.

In these prior art bulbs each edge of the contour of the viewing zone at the intersection of the front face of the zone with the apron is arcuate in a plane parallel to the axis of the bulb. The level curves of the viewing zone, that is, the sections of this zone through the planes parallel to the base have substantially a circular form.

An object of the present invention is to provide a bulb of a cathode tube wherein the peripheral contour of the viewing zone has the shape of a curvilinear rectangle, the four sides of which are disposed in a plane substantially perpendicular to the axis of the bulb.

According to the invention the cone of the bulb can be welded directly on the contour of curvilinear rectangular shape of the viewing zone or the screen can be provided with an apron having a substantially uniform height.

Another feature of the invention is that the viewing zone is so shaped that parallel sections through said zone parallel to the base of the cone define a curved line substantially parallel to the base end of said cone.

The new arrangement has the effect of important advantages which will result from the following description by way of example of a screen according to the invention with reference to the attached figures which represent:

Figure 1:
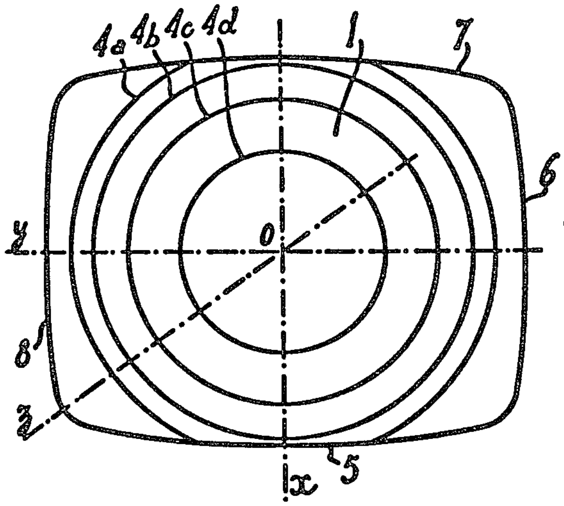
FIG. 1 is a front view of a prior art television tube.
Figure 2:
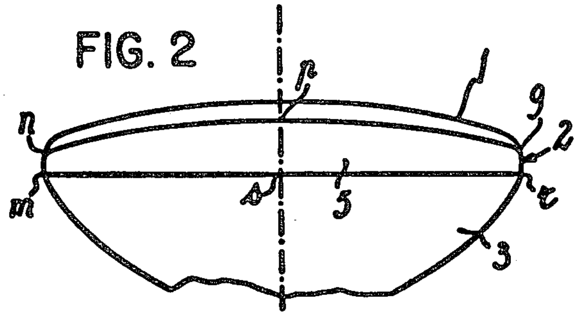
FIG. 2 is an elevation view corresponding to FIG. 1.
Figure 3:
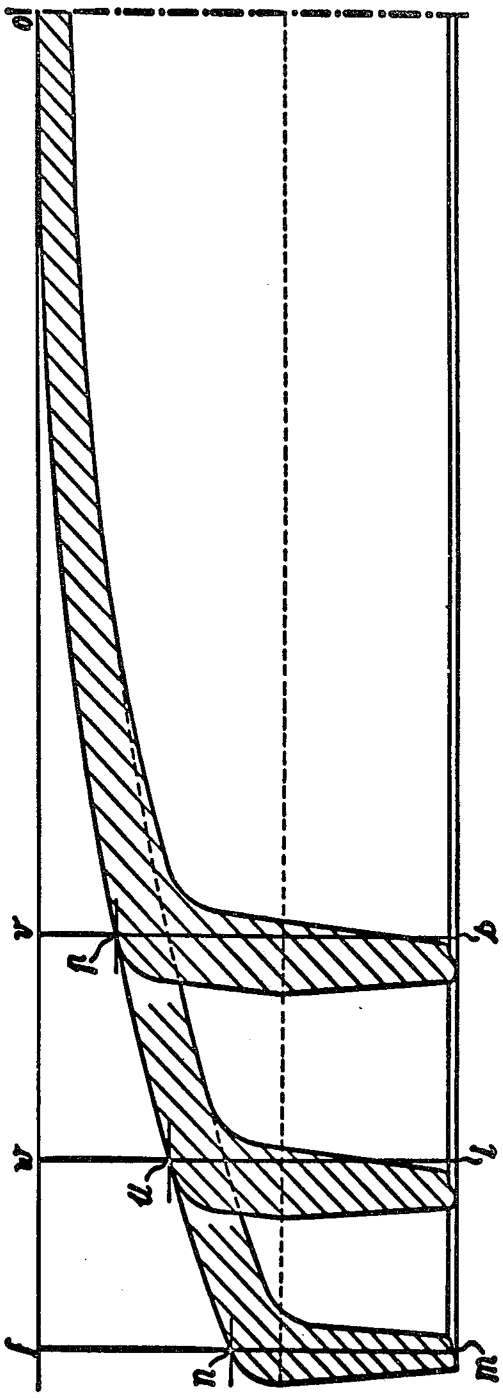
FIG. 3 shows various sections on a larger scale of the prior art screen.

In the television screen of the known type, represented in FIGS. 1–3, 1 is the viewing zone, of spherical form, 2 is the "apron" or border perpendicular to the viewing zone and connecting the latter with the rectangular curvilinear base of the cone 3.

We see that the level curves 4*a*, 4*b*, 4*c*, 4*d* of the viewing zone, that is, the sections of its surface through planes parallel to the base of the cone, are substantially circular. The four side walls 5, 6, 7, 8 of the apron, which correspond each to one side of the base of the cone, have the general form of a rectangle of progressively increasing height from the ends to the center. This way in the curvilinear rectangle *m n p q r s* constituting the wall 5 of the apron, which is shown in an elevation in FIG. 2, the height is smallest at the ends *m n* and *q r* and greatest at the center *p s*.

The maximum height is greater for the large sides 5, 7 of the apron than for the small sides 6, 8 as it can be seen from FIG. 3, which represents sections of the screen along *ox*, *oy*, *oz* of FIG. 1.

Ox, which intersects the screen through the symmetry plane perpendicular to its large side 5, intersects the latter along *s p*, which constitutes the maximum height of the apron of the screen.

On the other hand, *oz* which intersects the screen through its diagonal plane meets the large side 5 and the small side 8 along their intersection *m n*, which constitutes the minimum height of the apron of the screen.

Finally, *oy* which intersects the screen through the symmetry plane perpendicular to its small side 8, intersects the latter along *Tu*, a height of intermediate value.

We see also in FIG. 3 that, in counterpart to the variations of the apron height in the known screen, the bend of the viewing field is also variable, depending on whether it is measured in the plane of intersection *ox*, where it has the value *pv*, in the plane intersection *oy*, where it has the value *uw*, or in the diagonal plane of intersection *oz*, where it has the maximum, characteristic value *nf*.

Figure 4:
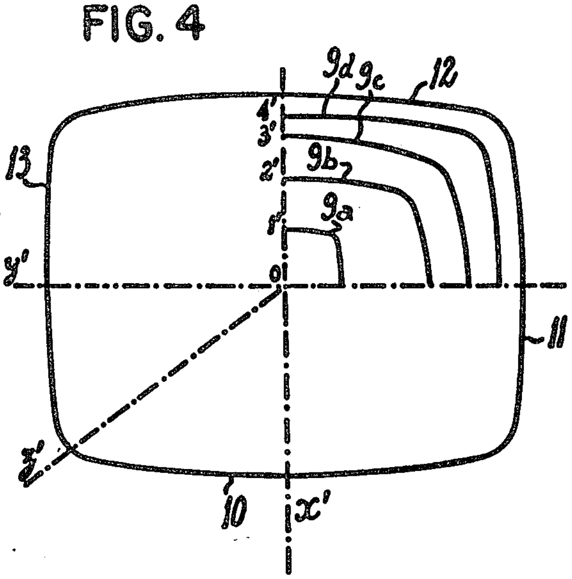
FIG. 4 is a front view of the television tube according to the invention.
Figure 5:
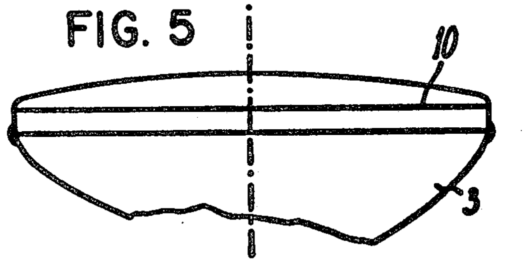
FIG. 5 is an elevation view corresponding to FIG. 4.

A television screen according to the invention is represented in its entirety in FIGS. 4 and 5. In this screen the level curves 9*a*, 9*c*, 9*d* which are substantially parallel to the contour of the cone base 3 are sections of the screen parallel to the base end of the cone. The four side walls 10, 11, 12, 13 of the apron have the general form of a rectangle of constant height, as shown by wall 10 in FIG. 5.

Figure 6:
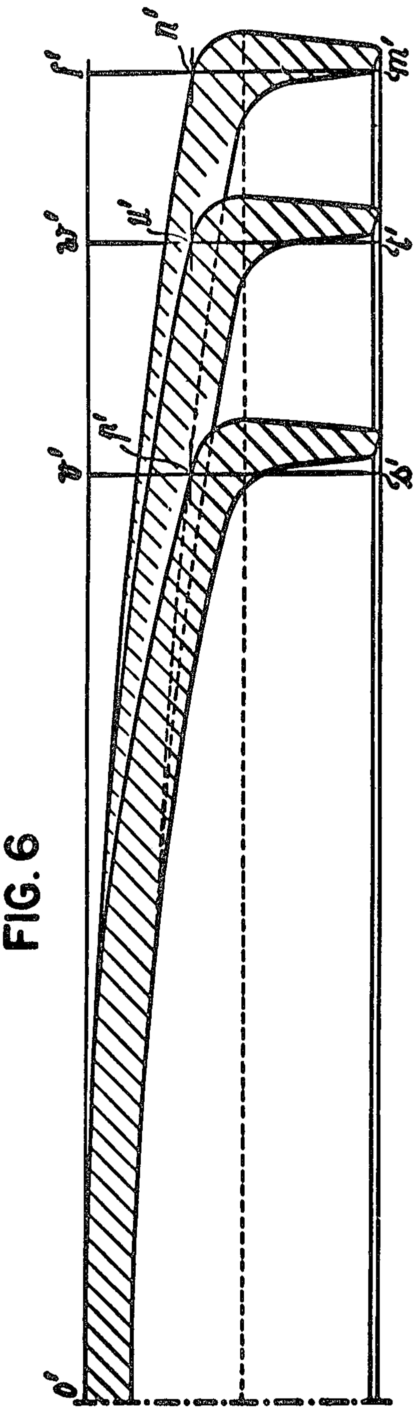

FIG. 6 which is similar to FIG. 3 represents sections of the screen through the plane *ox'*, *oy'*, *oz'* of FIG. 4. These planes of intersection meet respectively the centers of the large and small sides of the apron and the intersection of these sides along the heights *s' p'*, *t' u'* and *m' n'* which are equal to each other.

To the constant height of the apron of the screen according to the invention corresponds a constant bend of the viewing zone independent of the plane of intersection considered for the measurement of this bend. We see in fact that the bends *p'v'*, *u'w'* and *n'f* are equal.

The applicant has found that with equal resistance to the atmospheric pressure, regardless of the vacuum in the tube, the constant bend of a screen according to the invention is lower than the permissible bend of a conventional tube thereby providing a reduction of the encumbrance due to the depth of the tube.

Bulbs for cathode tubes and for television tubes in particular and these tubes themselves, are usually protected along the welding line of the cone with the screen by means of a belt surrounding the apron. The constancy of the height of the apron in the tubes according to the invention makes it easier and less costly to realize these protective belts and to secure them on the tube. The same holds true for the various devices, cabinet or other, destined to hide this part of the tube in the presentation of the television sets. Attention is directed in particular to the process of girdling, which is described in the French Pat. deposited in the name of the applicant on Nov. 22, 1963 for "Process for girdling glass vessels, for example, television tubes."

According to this process, the bulb is surrounded with a peripheral belt which is slightly greater than the periphery of the bulb, and the glass, made plastic by heat, is brought in contact with the belt, particularly by putting the inside of the bulb under pressure. Thanks to its constant height of the apron, the bulb according to the present invention is of particular advantage for the execution of this process.

Figure 7:
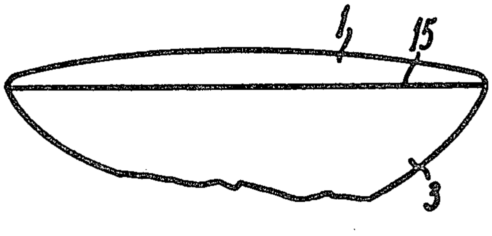
FIG. 6 shows various sections on a larger scale of the screen of this television tube according to the invention and FIG. 7 is a front view of a television tube according to the invention whose apron height is zero.

FIG. 7 shows a bulb according to the invention whose apron height is zero, the viewing zone 1 with constant bend being connected with the cone at 15 along the plane of the cone base.

A screen with a constant height apron or no apron can be obtained according to the invention by the usual pressing method.

It can also be obtained in a particularly advantageous manner, particularly with an apron of height zero, by bending a glass sheet under the action of its own weight which is supported at its periphery by a "skeleton" having precisely the form of the rectangular contour at the base of the cone. The form thus obtained by bending has then naturally substantially level curves parallel to the skeleton, that is, to the contour of the cone base to which the screen will be connected by welding. The same holds true if, instead of bending the glass sheet under the action of its owns weight, the bending is effected by a vacuum or under load. The form of the bending is than different, but the level curves remain parallel, to the contour of the cone base.

For the realization of the picture screen according to this process one can start with polished glass which does not require subsequent polishing on the inner surface which is in certain cases, particularly for the color television, a costly inconvenience in the manufacture of the known screens.

Numerous other modifications and substitutions of equivalents will readily occur to those skilled in the art, after a study of the foregoing disclosure. Hence the disclosure is to be taken in an illustrative rather than a limiting sense; and all modifications, alterations, rearrangements and substitutions within the scope of the subjoined claims, are reserved.

Having now fully disclosed the invention, what I claim and desire to secure by Letters Patent of the United States is:

1. A bulb for a cathode tube comprising a cone having a narrow end and a wide substantially rectangular base end, a screen having a curved viewing portion having a substantially rectangular peripheral contour complementary to the contour of the base end of said cone, said viewing portion being so curved that sections therethrough parallel to said base cone end define curves which are substantially parallel to said cone base end contour, and means securing together said cone base end and said screen at their respective edges.

2. A bulb according to claim 1 wherein the substantially rectangular peripheral contour of said curved viewing portion of the screen is secured directly to the rectangular base end of said cone.

3. A bulb according to claim 1 wherein said screen further comprises apron means having four substantially rectangular walls of constant equal height disposed about the rectangular peripheral contour of said screen.

* * * * *